United States Patent
Upasani et al.

(10) Patent No.: US 10,318,748 B2
(45) Date of Patent: Jun. 11, 2019

(54) TECHNIQUES TO PROTECT FUSES AGAINST NON-DESTRUCTIVE ATTACKS

(71) Applicant: INTEL CORPORATION, Santa Clara, CA (US)

(72) Inventors: Neeraj S. Upasani, Portland, OR (US); David P. Turley, North Plains, OR (US); Sergiu D. Ghetie, Hillsboro, OR (US); Zhangping Chen, Hillsboro, OR (US); Jason G. Sandri, Gilbert, AZ (US)

(73) Assignee: INTEL CORPORATION, Santa Clara, CA (US)

( * ) Notice: Subject to any disclaimer, the term of this patent is extended or adjusted under 35 U.S.C. 154(b) by 424 days.

(21) Appl. No.: 15/283,087

(22) Filed: Sep. 30, 2016

(65) Prior Publication Data

US 2018/0095897 A1    Apr. 5, 2018

(51) Int. Cl.
G06F 21/62 (2013.01)
G06F 21/60 (2013.01)
G11C 7/24 (2006.01)
G11C 7/10 (2006.01)
G11C 17/18 (2006.01)
G11C 29/00 (2006.01)

(52) U.S. Cl.
CPC ........ G06F 21/6218 (2013.01); G06F 21/602 (2013.01); G11C 7/1006 (2013.01); G11C 7/24 (2013.01); G11C 17/18 (2013.01); G06F 2221/2107 (2013.01); G11C 29/787 (2013.01)

(58) Field of Classification Search
CPC .............. G06F 21/6218; G06F 21/602; G06F 2221/2107; G11C 17/18; G11C 7/1006; G11C 7/24; G11C 29/787
See application file for complete search history.

(56) References Cited

U.S. PATENT DOCUMENTS

| | | | |
|---|---|---|---|
| 8,502,555 B1 * | 8/2013 | Peterson | G11C 16/225 326/105 |
| 8,539,254 B1 * | 9/2013 | Bridgford | H04L 67/34 713/100 |
| 9,230,112 B1 * | 1/2016 | Peterson | G06F 21/575 |
| 9,413,356 B1 * | 8/2016 | McKinley | H03K 19/17768 |
| 9,660,802 B1 * | 5/2017 | McKinley | H04L 9/065 |
| 9,729,518 B1 * | 8/2017 | Atsatt | H04L 63/0428 |
| 9,946,826 B1 * | 4/2018 | Atsatt | G06F 17/5054 |
| 2002/0029346 A1 * | 3/2002 | Pezeshki | G06F 7/725 713/190 |

(Continued)

FOREIGN PATENT DOCUMENTS

EP    2506176 A1 * 10/2012 ............. G06F 21/72

*Primary Examiner* — Robert B Leung
*Assistant Examiner* — Thomas Ho

(57) ABSTRACT

Embodiments may be generally directed to techniques to encrypt and decrypt data in a first fuse block array using an encryption key of a second fuse block array, the second fuse block array having the encryption key comprising a plurality of segments of bits, an inverse encryption key comprising a second plurality of segments of bits, each segment of the inverse encryption key to correspond with a particular segment of the encryption key, and a random pattern having equally distributed bit values, the random pattern to enable detection of voltage attacks on the second fuse block array.

25 Claims, 7 Drawing Sheets

(56) References Cited

U.S. PATENT DOCUMENTS

| | | | |
|---|---|---|---|
| 2007/0168676 A1* | 7/2007 | Fayad | G06F 21/72 |
| | | | 713/185 |
| 2007/0177441 A1* | 8/2007 | Lee | G11C 29/787 |
| | | | 365/200 |
| 2011/0138192 A1* | 6/2011 | Kocher | G06F 21/602 |
| | | | 713/189 |
| 2012/0057423 A1* | 3/2012 | Chen | G11C 17/165 |
| | | | 365/225.7 |
| 2012/0060038 A1* | 3/2012 | Trimberger | G06F 21/755 |
| | | | 713/189 |
| 2014/0006797 A1* | 1/2014 | Cordella | G06F 21/6209 |
| | | | 713/189 |
| 2015/0161059 A1* | 6/2015 | Durham | G06F 12/1408 |
| | | | 713/193 |
| 2016/0373264 A1* | 12/2016 | Katoh | H04L 9/3278 |
| 2018/0034625 A1* | 2/2018 | Hunacek | G06F 21/445 |

* cited by examiner

TECHNIQUES TO PROTECT FUSES AGAINST NON-DESTRUCTIVE ATTACKS

TECHNICAL FIELD

Embodiments described herein generally relate to protecting fuses of fuse block arrays against non-destructive attacks.

BACKGROUND

Storage elements, such as fuses, may be programmed to write information into fuse block arrays, and sensed to read information from the fuse block arrays. The fuse block arrays may be memory arrays including bits arranged in rows and columns. These fuse block arrays are sensed on a row-by-row basis. However, this exposes the fuses to non-destructive attacks, such as side channel attacks and voltage attacks. During these attacks, the values of the fuses can be determined during sensing. The fuses can hold sensitive information; thus, protection against these types of attacks is very important.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1A:
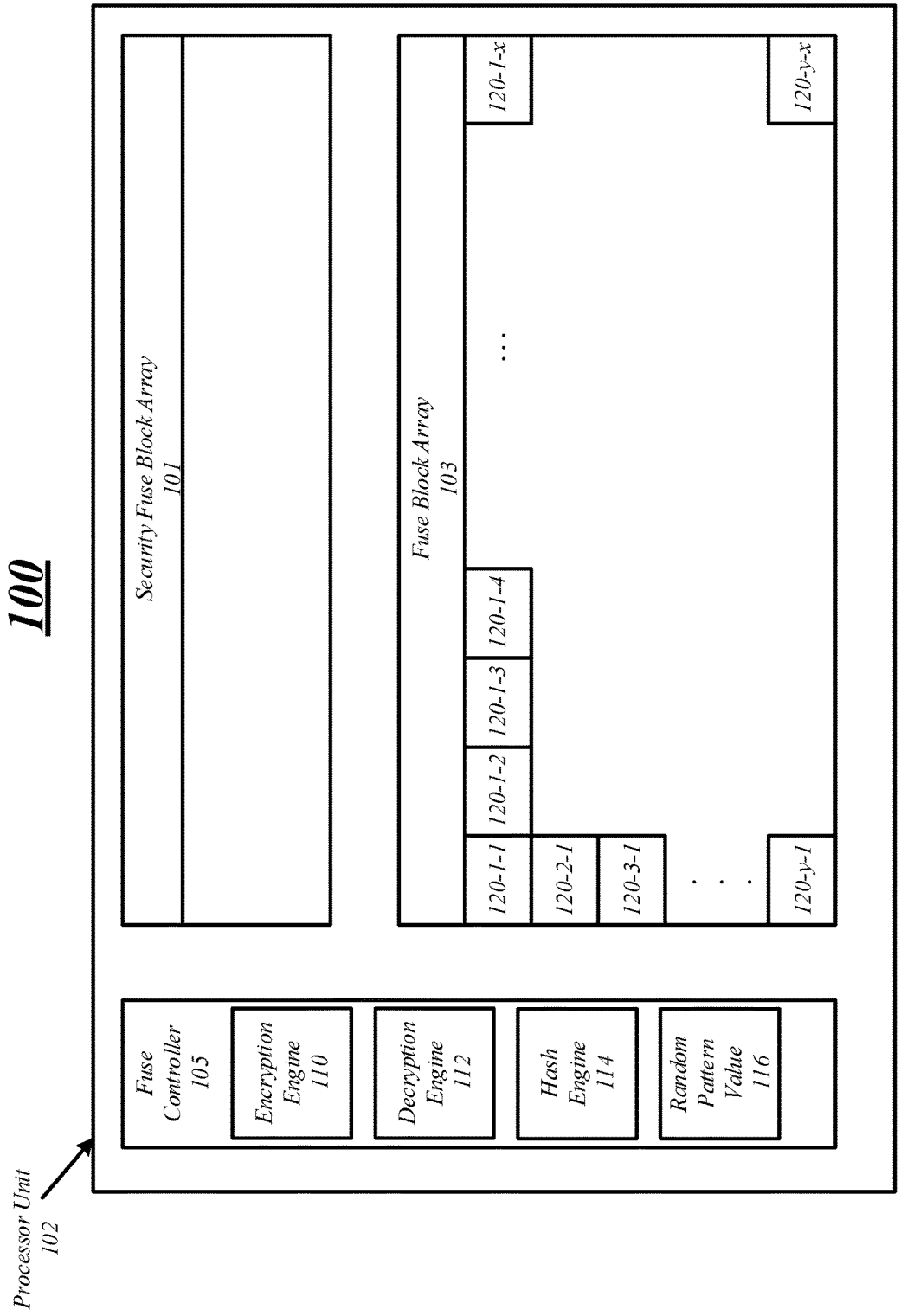
FIG. 1A illustrates an example of a system.

Various embodiments discussed herein may include methods, apparatuses, devices, and systems to prevent non-destructive attacks of storage elements, such as fuses. As mentioned, these non-destructive attacks may include voltage attacks and side-channel attacks. Current solutions include differential power analysis, current sensing, voltage level detectors, and so forth. However, these solutions tend to be hard to manage, can potentially grow fuse counts, can include complicated analog circuits, hard to scale, and can be difficult to debug. Embodiments discussed herein are advantageous over the current solutions because they prevent non-destructive attacks without the problems created by the current solutions.

Embodiments include providing fuse based primitives to detect whether fuses are sensed outside specific voltage ranges, encrypting information stored in a fuse block array, and protecting the key used for the encryption in a fortress of protections. Also, the information may be validated by using hashing techniques. These and other details will become more apparent in the following description.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1A illustrates a general overview of a system 100 which may be part of a processor unit 102. The processor unit 102 may be of any type of computational element, such as but not limited to, a microprocessor, a processor, central processing unit, digital signal processing unit, dual core processor, a multi-core processor, mobile device processor, desktop processor, single core processor, a system-on-chip (SoC) device, complex instruction set computing (CISC) microprocessor, a reduced instruction set (RISC) microprocessor, a very long instruction word (VLIW) microprocessor, a field-programmable gate array (FPGA) circuit, application specific integrated circuit (ASIC) or any other type of processor or processing circuit on a single chip or integrated circuit.

In some embodiments, the system 100 may be on-die of the processor unit 102 and may include a fuse controller 105, which may be an original equipment manufacturer (OEM) fuse controller or user programmable fuse controller. The fuse controller 105 may be coupled to a fuse mapping to individual fuse buses of a security fuse block array 101 and a fuse block array 103. Further, the fuse controller 105 may be coupled with one or more other interfaces, which may be connected to and communicate with the other elements of the processor unit 102, for example. In some embodiments, the processor unit 102 may include processing circuitry and processor registers or a small amount of storage available, such that the processor unit 102 can store information including instructions that and can be accessed during execution, and during reading from and writing to the fuse block array 103, for example. These processor registers are normally at the top of the memory hierarchy and provide the fastest way to access data.

In some embodiments, the processor unit 102 may be coupled to a memory (not shown) that can store data momentarily, temporarily, or permanently. The memory may store temporary variables or other intermediate information while the processing circuitry of the processor unit 102 is executing instructions. In some embodiments, information and data may be loaded from memory into the computing registers during processing of instructions. Manipulated data is then often stored back in memory, either by the same instruction or a subsequent one. The memory is not limited to storing the above-discussed data; the memory may store any data.

As mentioned, the processor unit 102 may include a fuse block array 103 having a number of memory cells or fuse blocks 120-*y*-*x*, where y and x may be any positive integer and not necessarily the same integer. The fuse blocks 120 may be programmed at the time of manufacture or by other entities after the processor unit 102 has shipped. For example, a user may write data into fuse blocks 120 of the fuse block array 103 and read the date from fuse blocks 120 of the fuse block array 103. In some instances, the processor unit 102 and/or fuse controller 105 includes a fuse read/write state machine (not shown) and a fuse voltage regulator state machine (not shown) to perform programming and sensing of the fuse block array 103. The fuse read/write state machine may issue programming and sensing signals to the appropriate fuse blocks 120 of the fuse block array 103 for programming, for example. Other components of the processor unit 102 include registers to control aspects of reading and writing to the fuse block array 103. These registers may be used to set voltage levels and programming durations, for example.

In some embodiments, the fuse controller 105 may also include an encryption engine 110, a decryption engine 112, a hash engine 114, and a random pattern value 116. These components may also be implemented on-die in hardware. However, embodiments are not limited in this manner. For example, one or more of the encryption engine 110, the decryption engine 112, the hash engine 114, and the random pattern value 116, may be implemented on-die of another component, e.g. hardware different than the processor unit 102. In even different instances, the components may be implemented in software and/or firmware. In embodiments, the encryption engine 110 may perform encryption operations, the decryption engine 112 may perform decryption operations, and the hash engine 114 may perform validation and integrity operations, as discussed herein.

The encryption engine 110, the decryption engine 112, the hash engine 114, and the random pattern value 116 in conjunction with the security fuse block array 101 may be utilized by the fuse controller 105 to read and write data to the fuse block array 103 while preventing non-destructive attacks, such as side channel probing attacks and voltage attacks. For example, embodiments include encrypting all of the fuse blocks 120 of the fuse block array 103 to protect the fuses against these non-destructive attacks. Also, the security fuse block array 101 may provide a fortress of protection for an encryption key utilized to encrypt/decrypt data stored in the fuse blocks 120 by the encryption engine 110 and decryption engine 112. Additional protections include validating and ensuring the integrity of the data in the fuse blocks 120 using hashing techniques and storing hash values in the security fuse block array 101 performed by the hashing engine 114, for example.

Figure 1B:
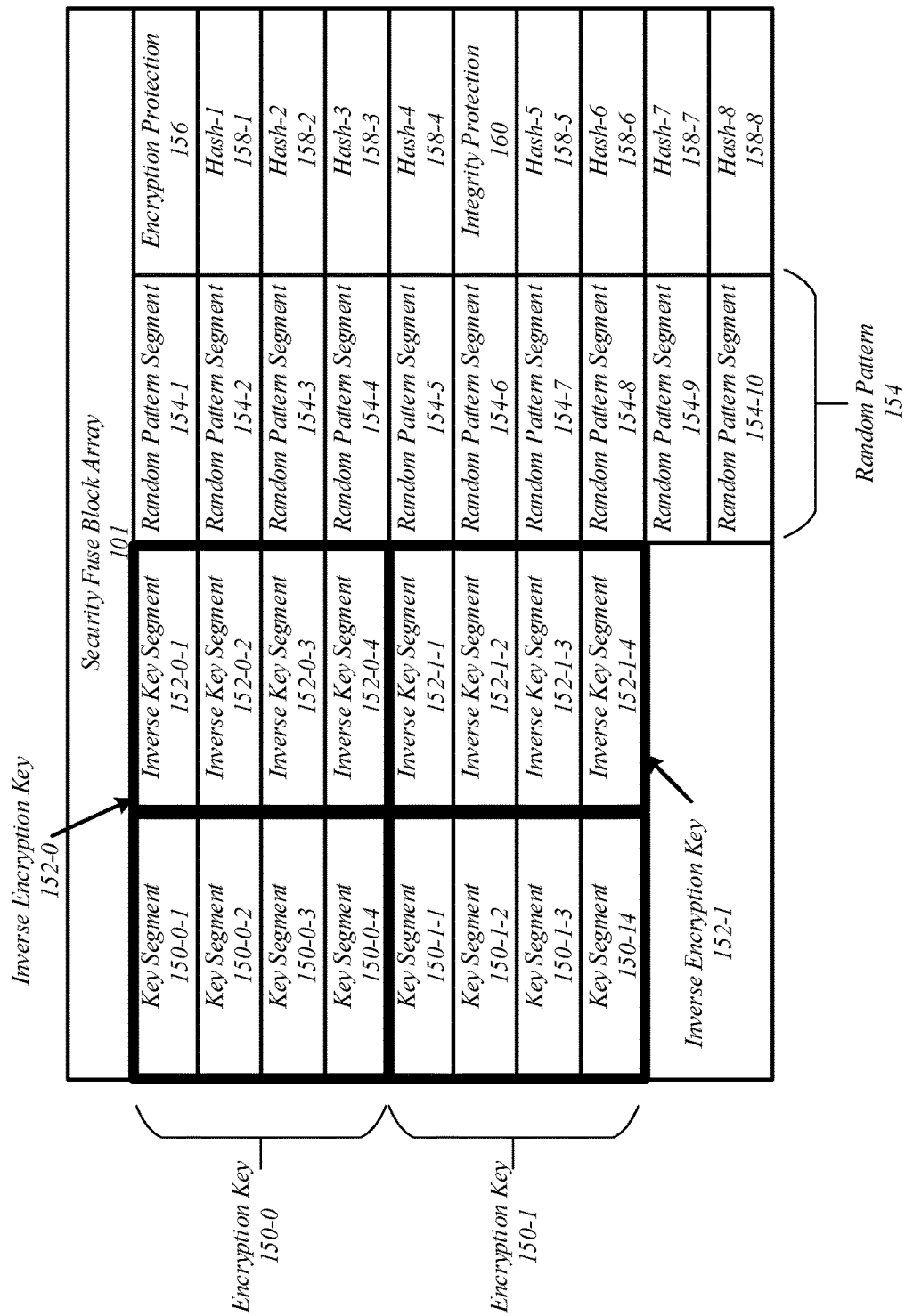
FIG. 1B illustrates an example of a security fuse block array.

FIG. 1B illustrates an example of the security fuse block array 101, portions of which may be implemented during the design phase of the processor unit 102 and generated on-die during manufacturing. The security fuse block array 101 includes an encryption key 150-0 and a duplicate encryption key 150-1, which is a duplicate of the encryption key 150-0. The encryption key 150-0 may include key segments 150-0-1 through 150-0-4. Each of the key segments 150-0-1 through 150-0-4 may include thirty-two (32) bits of the encryption key 150-0. Similarly, the encryption key 150-1 may include key segments 150-1-1 through 150-1-4, which are duplicates of the corresponding key segments 150-0-1 through 150-0-4, respectively. Duplicate encryption keys may be utilized to provide full redundancy for every bit of the encryption key 150-0; thus mitigating any silicon yield concerns around the security fuse block array 101. In embodiments, the encryption keys 150-0 and 150-1 may be a 128-bit advanced encryption standard (AES) keys that may be used with a symmetric encryption algorithm by the fuse controller 105. However, Embodiments are not limited in this manner, and different encryption key sizes, algorithms, and techniques may be used.

The security fuse block array 101 may also include inverse encryption keys 152-0 and 152-1, which may be the inverse of encryption keys 150-0 and 150-1, respectively. Thus, the inverse encryption keys 152-0 and 152-1 may also be 128 bits and broken into 32-bit key segments 152-0-1 through 152-0-4 for inverse encryption key 152-0 and key segments 152-1-1 through 152-1-4 for inverse encryption key 152-1. The fuse controller 105 may sense the encryption key segments and inverse encryption key segments row-wise, such that each key segment 150-*a-b* and inverse key segment 152-*a-b*, where a and b are positive integers, ensures that a perfect hamming weight is maintained for the encryption keys 150-0 and 150-1. For example, key segment 150-0-1 and inverse key segment 152-0-1 may be sensed while maintaining a perfect hamming weight for encryption key 150-0. Similar senses may occur for each key segment 150-*a-b* and inverse key segment 152-*a-b* for the encryption keys 150-0 and 150-1. Further, the encryption keys 150-0 and 150-1 and inverse encryption keys 152-0 and 152-1 may be stored in high security fuses to protect them from physical attacks.

In some embodiments, each key segment 150-*a-b* and inverse key segment 152-*a-b* may be sensed with a random pattern segment 154-*x*, where x may be any positive integer, in the same row as the sensed key segment-a-b and inverse key segment 152-*a-b*. For example, key segment 150-0-1, inverse key segment 152-0-1, and random pattern segment 154-1 may be sensed together, and are in the same row of the security fuse block array 101. The random pattern segment 154-*x* may be used to ensure that a voltage attack is not occurring while sensing of the fuses of the security fuse block array 101. For example, the fuse controller 105, when sensing fuses, reads a value of zero '0' if the fuse is un-programmed or a value of one '1' if the fuse is programmed. During a voltage attack, if the voltage during sensing is below a specified tolerance range (under-voltage), then both the programmed and un-programmed fuse bits read a value of zero '0'. If the voltage is above the specified tolerance range (over-voltage), then both the programmed and un-programmed fuse reads a value of one '1'.

In embodiments, a random pattern segment 154-*x* may be compared with a fixed pre-silicon random pattern value 116 of the fuse controller 105. If the random pattern segment 154-*x* matches the random pattern value 116, the fuse controller 105 may determine that a voltage attack is not occurring. However, if the sensed random pattern segment 154-*x* does not match the random pattern value 116, the fuse controller 105 may determine that a voltage attack is occurring. In some instances, a different random pattern segment 154-*x* may be in each row of the security fuse block array 101 and compared with a different random pattern value 116 of the fuse controller 105. In other words and the illustrated example, the random pattern value 116 may include eight different random patterns each to compare with a random pattern segment 154-*x* based on a particular row sensed. In other instances, the same random pattern segment 154-*x* may be in each row and compared to a single random pattern value 116 of the fuse controller 105. Further, the random pattern value 116 may be a 32-bit random number constructed from equally distributed ones (derived from pre-programmed fuse bits) and zeroes (derived from un-programmed fuse bits). Moreover, each random pattern value 154-*x* may be a 32-bit random pattern to match the random pattern value 116.

The security fuse block 101 may also include one or more hash values 158. In the illustrated example, the security fuse block array 101 includes eight hash values 158-1 through 158-8. However, embodiments are not limited in this manner. The hash values 158 may be used to perform integrity checks when reading data from the fuse block array 103. For example, each time the fuse controller 105 senses data in the fuse block array 103 a hash value may be generated and compared with a hash value 158 stored in the security fuse block array 101. If the hash values match, e.g. the generated hash value matches the stored hash value 158, then the data read from the fuse block array 103 is validated. However, if the hash values do not match the data may not be validated. This may indicate that the fuse sensing operation is being tampered with and fuse values (data) are not reliable.

In embodiments, the security fuse block array 101 also includes an encryption protection enable 156 and an integrity protection enable 160, which may be used to enable and disable encryption and integrity checking, respectively. The encryption protection enable 156 and the integrity protection enable 160 may each be 32 bits and a pre-defined pattern to protect against manipulation of the enable settings via side channel attacks, for example. These encryption protection enable 156 and integrity protection enable 160 may be used to aid manufacturing and debugging flows wherein most of the fuses have to be overridden several times before a stable fuse setting is determined. They may also be used as a debug/survivability mechanism, for example. Embodiments are not limited in this manner.

Figure 2:
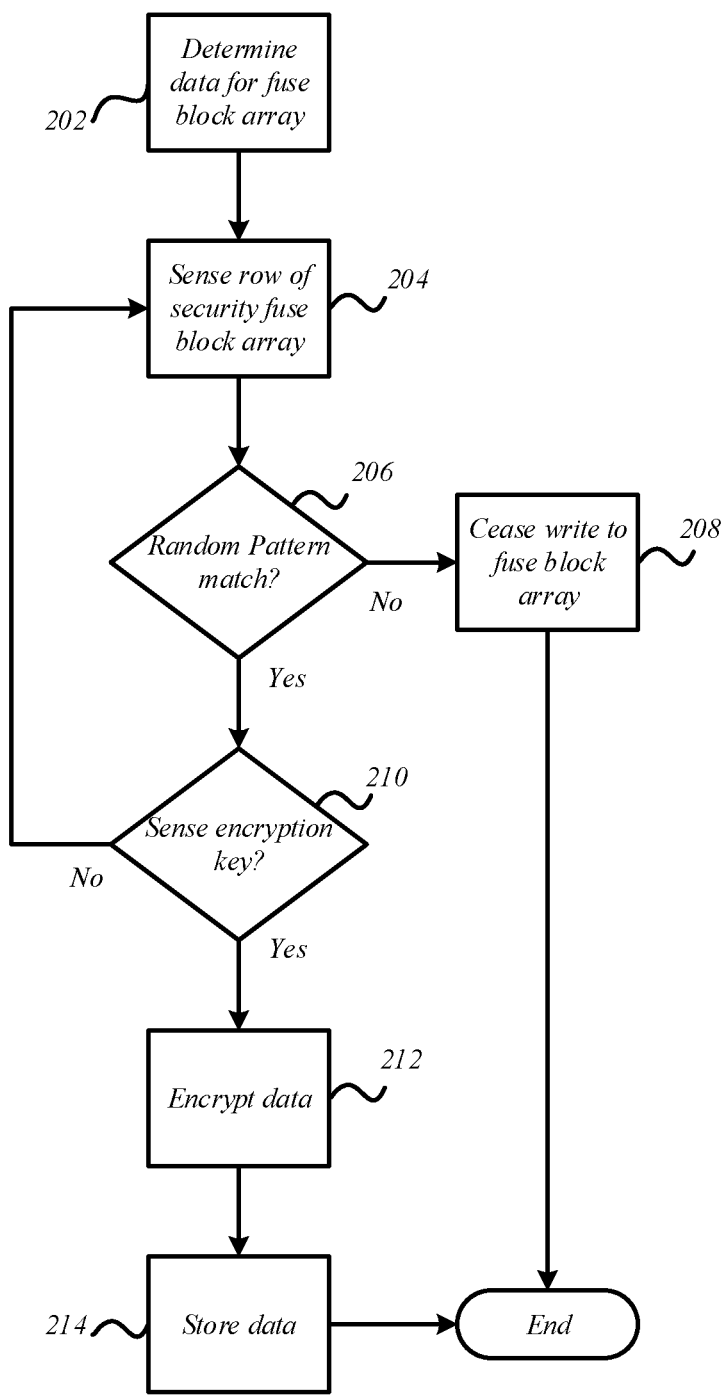
FIG. 2 illustrates an example of a first logic flow diagram.

FIG. 2 illustrates an example of a first logic flow 200 for programming a fuse block array of fuses. The logic flow 200 may be representative of some or all of the operations executed by one or more embodiments described herein. For example, the logic flow 200 may illustrate operations performed by fuse controller 105, as illustrated in FIGS. 1A and 1B. For example, the fuse controller 105 may include circuitry, such as the encryption engine 110, decryption engine 112, and hash engine 114, to perform various operations discussed herein.

At block 202, the logic flow 200 may include determining data for storing or programming in a fuse block array, such as fuse block array 103 illustrated in FIG. 1A. In some instances, the data may be a string loaded into a fuse register file storage. The fuse controller 105 may be notified, e.g. a pin may be set, to program the fuse block array. The data may be encrypted and then stored/programmed into the cells or blocks of the fuse block array. To encrypt the data, the logic flow 200 may include sensing a row of a security fuse block array having an encryption key segment, an inverse encryption key segment, and a random pattern segment. As previously mentioned, the encryption key segment and the inverse encryption key segment may be used to maintain a perfect hamming weight while sensing. Further and at block 206, the logic flow 200 may include determining whether the random pattern segment sensed matches a random pattern value in a fuse controller. If the random patterns do not match, then the logic flow 200 may include ceasing operations of programming the fuse block array with the data at block 208.

At block 210, the logic flow 200 may include determining whether the entire encryption key for encrypting has been sensed from the security fuse block array. If not, then the logic flow 200 may include sensing a next row of the security fuse block array and ensuring a random pattern matches. The logic flow 200 may repeat these operations until the entire encryption key is read or sensed from the security fuse block array.

At block 212, the logic flow 200 includes encrypting the data for storage in the memory cells or blocks of the fuse block array. For example, the fuse controller performs an encryption of the data read from registers and stored in the fuse blocks of the fuse block array using the encryption key from the security fuse block array. Encrypting the data in the fuse block array prevents any side channel attacks since any data read or detected during an attack will be encrypted and useless to the attacker. In some instances, the fuse controller may also generate a hash value of the stored data and store the hash value in the security fuse block array, which may be used during reading or sensing data for integrity protection.

At block 214, the fuse controller may store or program the encrypted data into the fuse blocks of the fuse block array. For example, the fuse controller may program the data by writing or programming ones and zeros into the appropriate fuse blocks or memory cells.

Figure 3:
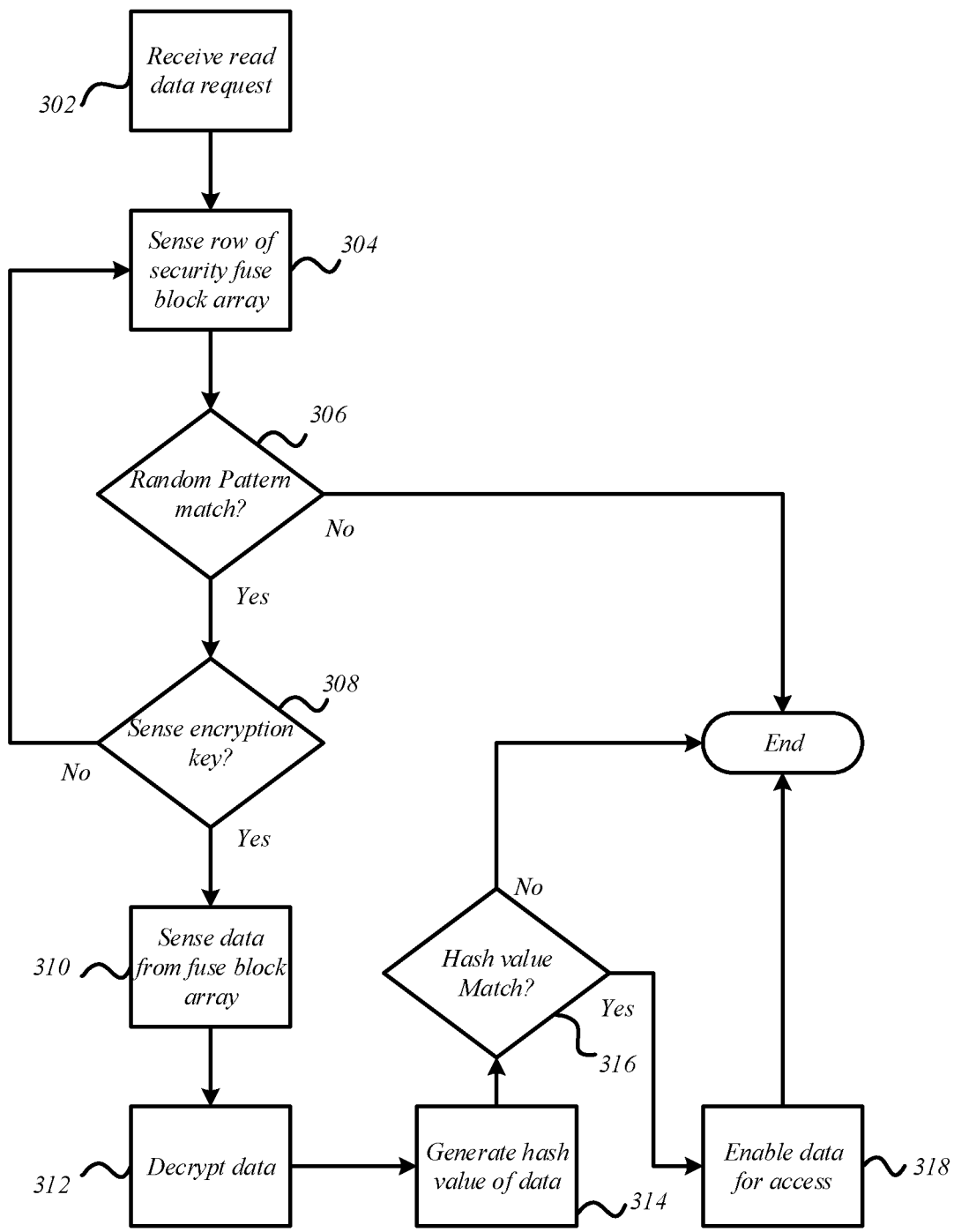
FIG. 3 illustrates an example of a second logic flow diagram.

FIG. 3 illustrates an example of a second logic flow 300 for sensing a fuse block array having fuses. The logic flow 300 may be representative of some or all of the operations executed by one or more embodiments described herein. For example, the logic flow 300 may illustrate operations performed by a fuse controller 105, as illustrated in FIGS. 1A and 1B. For example, the fuse controller 105 may include circuitry, such as the encryption engine 110, decryption engine 112, and hash engine 114, to perform various operation discussed herein.

At block 302, the logic flow 300 includes receiving a read data request by the fuse controller. For example, a pin or another indicator may be set to notify the fuse controller that data is desired from the fuse block array. The fuse controller may determine one or more locations or fuse blocks to sense of the fuse block array based on the data to sense. Further and previously mentioned, the data in the fuse blocks is encrypted. Thus, at block 304, the logic flow 300 may include sensing a row of a security fuse block array having an encryption/decryption key segment, an inverse encryption/decryption key segment, and a random pattern segment. As previously mentioned, the encryption key segment and the inverse encryption key segment may be used to maintain a perfect hamming weight while sensing. Note that the encryption key and decryption key may be the same key and sensed from the same location of the security fuse block array. Further and at block 306, the logic flow 300 may include determining whether the random pattern segment sensed matches a random pattern value in a fuse controller. If the random pattern does not match, then the logic flow 300 may include ceasing operations of programming the fuse block array with the data.

If the random pattern sensed matches the random pattern in the fuse controller, the logic flow 300 may include determining whether the entire encryption/decryption key for encrypting has been sensed from the security fuse block array. If not, then the logic flow 300 may include sensing a next row of the security fuse block array and ensuring a random pattern matches. The logic flow 300 may repeat these operations until the entire encryption key is read or sensed from the security fuse block array.

At block 310, the logic flow 300 includes sensing data from the fuse blocks of the fuse block array. At block 312, the fuse controller may decrypt the sensed data utilizing the encryption/decryption key sensed from the security block array. The fuse controller may decrypt by utilizing a decryption algorithm, such as an AES decryption algorithm. The sensed and decrypted data may be stored in one or more registers of fuse register file storage.

At block 314, the fuse controller may generate a hash value of the data. The fuse controller may generate the hash value using any hash algorithm, such as secure hash algorithm 1 (SHA-1), SHA-2, and SHA-3. A hash algorithm is a mathematical operation run on the data to ensure the integrity of the stored data. In one example, a function of SHA-2, such as SHA-256 and SHA-512 generate a hash value with 32-bit and 64-bit words, respectively. The functions use different shift amounts and additive constants to generate the hash value. At block 316, the generated hash value is compared to a hash value stored in the security fuse block array to validate the data. If the hash values do not match based on the comparison, the sense operation may cease. However, if the hash values do match, the data may be validated, and access to the data may be enabled at block 318. Embodiments are not limited in this manner. For example, particular blocks are illustrated as occurring in a particular; however, some blocks may occur before or after other blocks.

Figure 4:
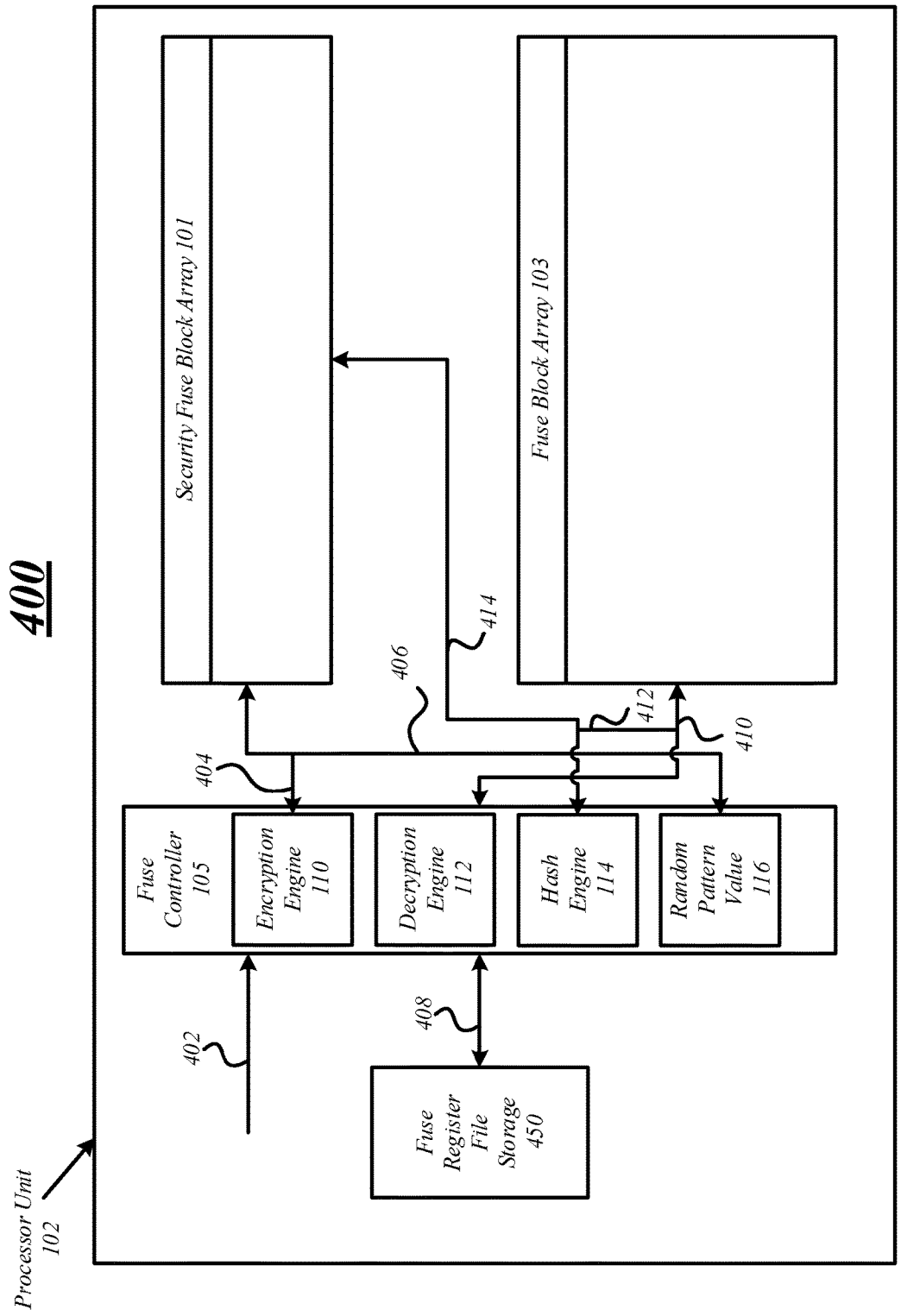
FIG. 4 illustrates an example of a first processing flow diagram.

FIG. 4 illustrates an example of a first processing flow 400 for programming a fuse block array of fuses. The processing flow 400 may be representative of some or all of the operations executed by one or more embodiments described herein. For example, the processing flow 400 is illustrated with the components illustrated in FIGS. 1A and 1B. However, embodiments are not limited in this manner.

At line 402, the processing flow 400 may include receiving an indication or notification to store data in the fuse block array 103. The indication or notification may include information to identify the data in the fuse register file storage 450 stored as a string. The fuse controller 105 may be notified, e.g. a pin may be set, to program the fuse block array with the data. To encrypt the data, the fuse controller 105 may sense retrieve the encryption key at line 404. As previously mentioned, the fuse controller may sense the encryption key on a row-by-row basis where each row the security fuse block array 101 has an encryption key segment, an inverse encryption key segment, and a random pattern segment.

For each row sensed, the fuse controller 105 may determine whether the random pattern segment sensed matches a random pattern value 116 in a fuse controller 105 at line 406. If the random patterns do not match, then the fuse controller 105 may cease operation of programming the fuse block array 103 with the data.

The fuse controller 105 may retrieve the encryption key and the data from the fuse register file storage 450 at line 408 to encrypt. Further, the fuse controller 105 may encrypt, using the sensed encryption key, the data for storage in the fuse blocks of the fuse block array 103. As mentioned, encrypting the data in the fuse block array 103 prevents any side channel attacks since any data read or detected during an attack will be encrypted and useless to the attacker.

At line 410, the encrypted data may be stored in the fuse block array 103 by the fuse controller 105. In some instances, the fuse controller 105 may also generate a hash value of the stored data and store the hash value in the security fuse block array at lines 412 and 414, which may be used during reading or sensing data for integrity protection.

Figure 5:
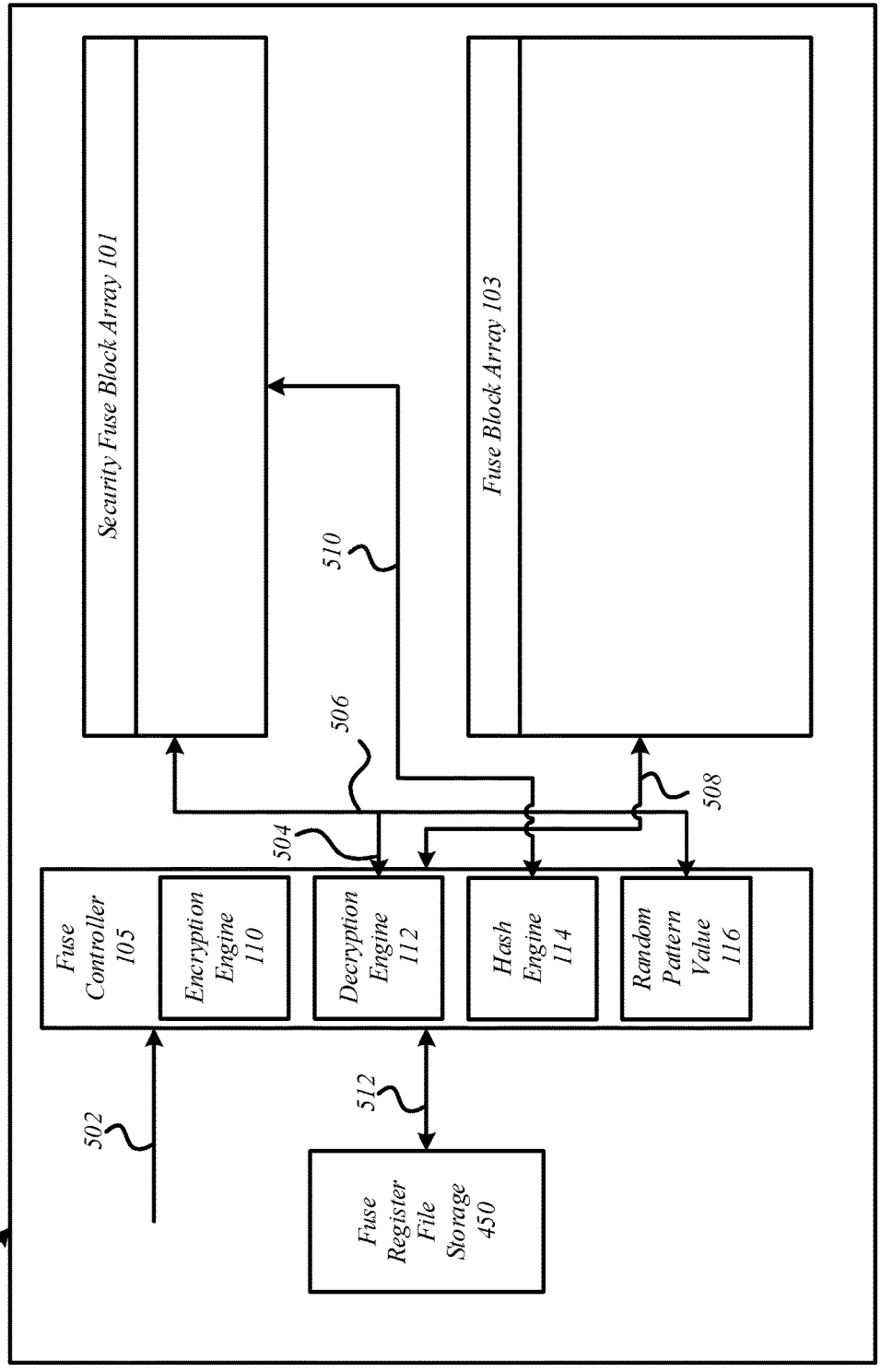
FIG. 5 illustrates an example of a second processing flow diagram.

FIG. 5 illustrates an example a second processing flow 500 for sensing a fuse block array 103 of fuses. The processing flow 500 may be representative of some or all of the operations executed by one or more embodiments described herein. For example, the processing flow 500 is illustrated with the components illustrated in FIGS. 1A and 1B. However, embodiments are not limited in this manner.

At line 502, the processing flow 500 includes receiving a read data request by the fuse controller 105. For example, a pin or another indicator may be set to notify the fuse controller 105 that data is desired from the fuse block array 103. The data may be identified in the request, and the fuse controller 105 may determine one or more locations or fuse blocks to sense of the fuse block array 103.

Further and previously mentioned, the data in the fuse blocks is encrypted. Thus, at line 504, the fuse controller 105 may sense rows of the security fuse block array 101 having an encryption/decryption key. As previously mentioned, the encryption/decryption key may include a number of segments each in a different row. In some embodiments, the encryption key and decryption key may be the same key and sensed from the same location of the security fuse block array 101. In other embodiments, the encryption key and decryption key may be different keys.

For each row sensed of the security fuse block array 101, the fuse controller 105 may also sense the inverse encryption/decryption key segment to ensure a perfect hamming weight and a random pattern. At line 506, the fuse controller 105 may determine whether the random pattern matches the random pattern value 116 in a fuse controller 105. If the random pattern does not match, then the fuse controller 105 may cease the sense operation.

If the random pattern sensed matches the random pattern 116 in the fuse controller 105 for each of the rows, the processing flow 500 may proceed with sensing the data from the fuse block array 103. The processing flow 500 may repeat these operations until the entire encryption key is read or sensed from the security fuse block array 101.

At line 508, the fuse controller 105 may sense the data from the fuse blocks of the fuse block array 103. Further, the fuse controller 150 may also decrypt the sensed data utilizing the encryption/decryption key sensed from the security fuse block array 101.

At line 510, the fuse controller 105 may generate a hash value of the decrypted data. The fuse controller 105 may generate the hash value using any hash algorithm, such as secure hash algorithm 1 (SHA-1), SHA-2, and SHA-3. A hash algorithm is a mathematical operation run on the data to ensure the integrity of the stored data. In one example, a function of SHA-2, such as SHA-256 and SHA-512 generate a hash value with 32-bit and 64-bit words, respectively. The fuse controller 105 may compare the generated hash value with a hash value stored in the security fuse block array 101 to validate the data. If the hash values do not match based on the comparison, the sense operation may cease. However, if the hash values do match, the data may be validated, and access to the data may be enabled at 512 in the fuse register file storage 450. Embodiments are not limited in this manner.

Figure 6:
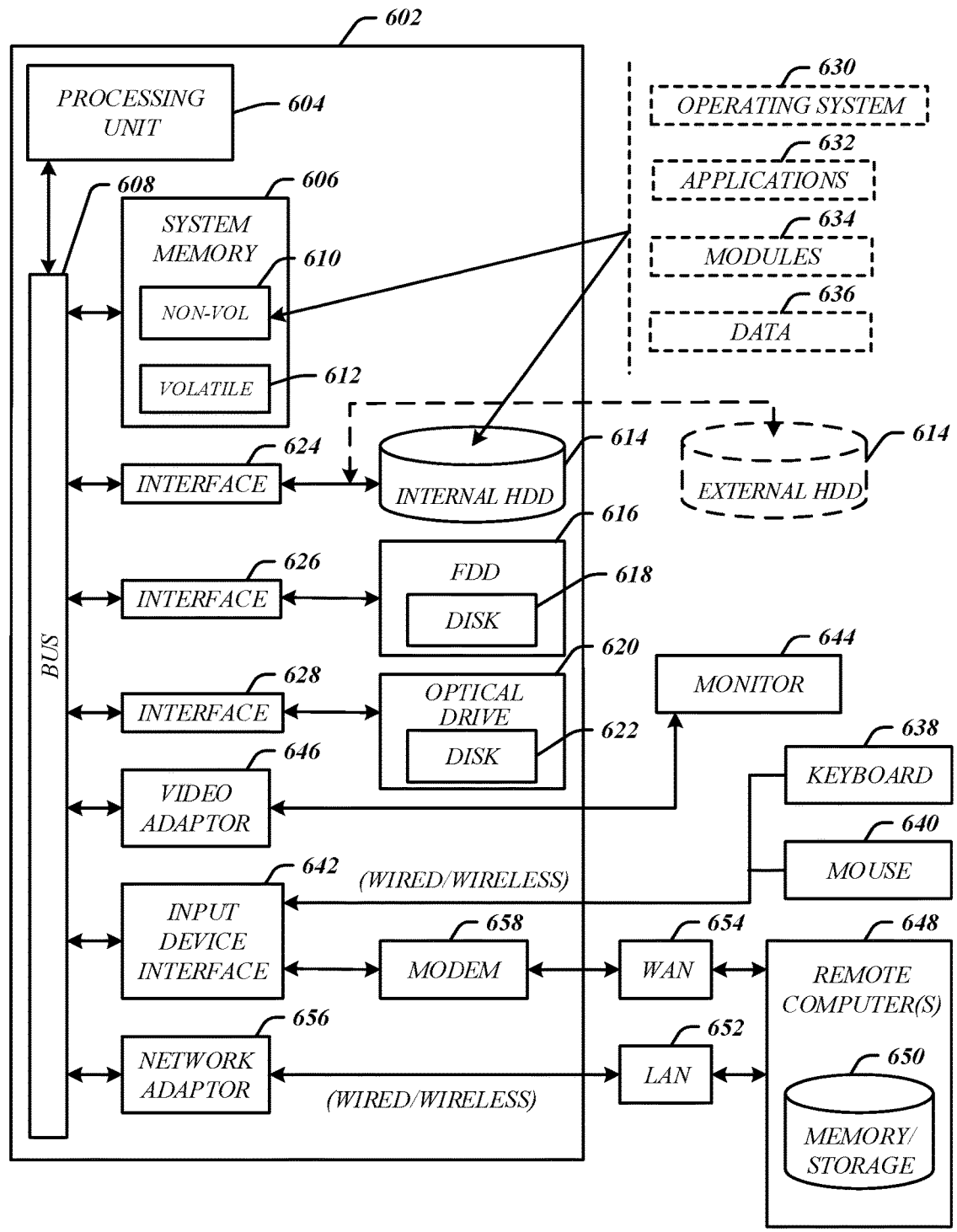
FIG. 6 illustrates an example of a computer architecture.

FIG. 6 illustrates an embodiment of an exemplary computing architecture 600 suitable for implementing various embodiments as previously described. In one embodiment, the computing architecture 600 may comprise or be implemented as part one or more systems and devices previously discussed.

As used in this application, the terms "system" and "component" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 comprises a processing unit 604, a system memory 606 and a system bus 608. The processing unit 604 can be any of various commercially available processors, such as those described with reference to the processing circuitry shown in FIG. 1A.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 600 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of the system 100.

A user can enter commands and information into the computer 602 through one or more wired/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 604 through an input device interface 642 that is coupled to the system bus 608, but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wired and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wired/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 802 family of standards, such as wireless devices operatively disposed in wireless communication (e.g., IEEE 802.11 over-the-air modulation techniques). This includes at least WiFi (or Wireless Fidelity), WiMax, and Bluetooth™ wireless technologies, 3G, 4G, LTE wireless technologies, among others. Thus, the communication can be a predefined structure as with a conventional network or simply an ad hoc communication between at least two devices. WiFi networks use radio technologies called IEEE 802.11x (a, b, g, n, etc.) to provide secure, reliable, fast wireless connectivity. A WiFi network can be used to connect computers to each other, to the Internet, and to wire networks (which use IEEE 802.3-related media and functions).

The various elements and components as previously described with reference to FIGS. 1-5 may comprise various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The detailed disclosure now turns to providing examples that pertain to further embodiments. Examples one through twenty-five (1-25) provided below are intended to be exemplary and non-limiting.

In a first example, a system, device, apparatus to prevent non-destructive attacks of fuse block arrays may include a first fuse block array including an encryption key comprising a plurality of segments of bits, the encryption key to encrypt data for a second fuse block array, an inverse encryption key comprising a second plurality of segments of bits, each segment of the inverse encryption key to correspond with a particular segment of the encryption key, and a random pattern having equally distributed bit values, the random pattern to enable detection of voltage attacks on the first fuse block array.

In a second example and in furtherance of the first example, a system, device, apparatus may include the first fuse block array including a plurality of hash values to validate data stored in the second fuse block array.

In a third example and in furtherance of any previous example, a system, device, apparatus may include the first fuse block array including an encryption protection enable segment and a integrity protection enable segment, the encryption protection enable segment to enable encryption for the second fuse block array and the integrity protection enable segment to enable hash value validation.

In a fourth example and in furtherance of any previous example, a system, device, apparatus may include fuse controller logic, at least a portion of which is implemented in circuitry, the fuse controller logic to encrypt and decrypt data in the second fuse block array using the encryption key of the first fuse block array.

In a fifth example and in furtherance of any previous example, a system, device, apparatus may include the fuse controller logic to generate a hash value for decrypted data of the second fuse array, and compare the hash value of the decrypted data with a second hash value stored in the first fuse block array to validate the decrypted data.

In a sixth example and in furtherance of any previous example, a system, device, apparatus may include the fuse controller logic to validate the decrypted data when the hash value matches the second hash value, and invalidate the decrypted data when the hash value does not match the second hash value.

In a seventh example and in furtherance of any previous example, a system, device, apparatus may include the fuse controller logic to compare the random pattern with a random pattern value of a fuse controller, in response to determining the random pattern and the random pattern value match, determine a voltage attack is not occurring; and in response to determining the random pattern and the random pattern value do not match, determine the voltage attack is occurring.

In an eighth example and in furtherance of any previous example, a system, device, apparatus may include the first fuse block array comprising a duplicate encryption key having duplicate bits of the encryption key, and a duplicate inverse encryption key having duplicate bits of the inverse encryption key.

In a ninth example and in furtherance of any previous example, a system, device, apparatus may include the first fuse block array and the second fuse block array comprising programmable read-only memory (PROM).

In a tenth example and in furtherance of any previous example, a system, device, apparatus may include a processor unit having the first fuse block array, the second fuse block array, and the fuse controller logic.

In an eleventh example and in furtherance of any previous example, a non-transitory computer-readable storage medium comprising a plurality of instructions that, when executed by circuitry, enable circuitry to encrypt and decrypt data in a first fuse block array using an encryption key of a second fuse block array, the second fuse block array including the encryption key comprising a plurality of segments of bits, an inverse encryption key comprising a second plurality of segments of bits, each segment of the inverse encryption key to correspond with a particular segment of the encryption key, and a random pattern having equally distributed bit values, the random pattern to enable detection of voltage attacks on the second fuse block array.

In a twelfth example and in furtherance of any previous example, a non-transitory computer-readable storage medium comprising a plurality of instructions that, when executed by circuitry, enable circuitry to generate a hash value for decrypted data of the first fuse block array, and compare the hash value of the decrypted data with a second hash value stored in the second fuse block array to validate the decrypted data.

In a thirteenth example and in furtherance of any previous example, a non-transitory computer-readable storage medium comprising a plurality of instructions that, when executed by circuitry, enable circuitry to validate the decrypted data when the hash value matches the second hash value, and invalidate the decrypted data when the hash value does not match the second hash value.

In a fourteenth example and in furtherance of any previous example, a non-transitory computer-readable storage medium comprising a plurality of instructions that, when executed by circuitry, enable circuitry to compare the random pattern with a random pattern value of a fuse controller, determine a voltage attack is not occurring in response to determining the random pattern and the random pattern value match, and determine the voltage attack is occurring in response to determining the random pattern and the random pattern value do not match.

In a fifteenth example and in furtherance of any previous example, a non-transitory computer-readable storage medium includes the second fuse block array comprising a plurality of hash values to validate data stored in the second fuse block array.

In a sixteenth example and in furtherance of any previous example, a non-transitory computer-readable storage medium includes the second fuse block array comprising an encryption protection enable segment and a integrity protection enable segment, the encryption protection enable segment to enable encryption for the second fuse block array and the integrity protection enable segment to enable hash value validation.

In a seventeenth example and in furtherance of any previous example, a non-transitory computer-readable storage medium comprising a plurality of instructions that, when executed by circuitry, enable circuitry to perform encryption and decryption of the data when the encryption protection enable segment is enabled, and validate the data when the integrity protection enable segment is enabled.

In an eighteenth example and in furtherance of any previous example, a computer-implemented method to prevent non-destructive attacks of fuse block arrays may include encrypting data in a first fuse block array using an encryption key of a second fuse block array, the second fuse block array including the encryption key comprising a plurality of segments of bits, an inverse encryption key comprising a second plurality of segments of bits, each segment of the inverse encryption key to correspond with a particular segment of the encryption key, and a random pattern having equally distributed bit values, the random pattern to enable detection of voltage attacks on the second fuse block array.

In a nineteenth example and in furtherance of any previous example, a computer-implemented method may include decrypting data in a second fuse block array using the encryption key of the first fuse block array.

In a twentieth example and in furtherance of any previous example, a computer-implemented method may include generating a hash value for decrypted data of the first fuse block array, and comparing the hash value of the decrypted data with a second hash value stored in the second fuse block array to validate the decrypted data.

In a twenty-first example and in furtherance of any previous example, a computer-implemented method may include validating the decrypted data when the hash value matches the second hash value, and invalidating the decrypted data when the hash value does not match the second hash value.

In a twenty-second example and in furtherance of any previous example, a computer-implemented method may include comparing the random pattern with a random pattern value of a fuse controller, determining a voltage attack is not occurring in response to determining the random pattern and the random pattern value match, and determining the voltage attack is occurring in response to determining the random pattern and the random pattern value do not match.

In a twenty-third example and in furtherance of any previous example, a computer-implemented method may include the second fuse block array including a plurality of hash values to validate data stored in the second fuse block array.

In a twenty-fourth example and in furtherance of any previous example, a computer-implemented method may include the second fuse block array comprising an encryption protection enable segment and a integrity protection enable segment, the encryption protection enable segment to enable encryption for the second fuse block array and the integrity protection enable segment to enable hash value validation.

In a twenty-fifth example and in furtherance of any previous example, a computer-implemented method may include performing encryption and decryption of the data when the encryption protection enable segment is enabled, and validating the data when the integrity protection enable segment is enabled.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. An apparatus, comprising:
a first fuse block array comprising:
an encryption key comprising a plurality of segments of bits, the encryption key to encrypt data for a second fuse block array;
an inverse encryption key comprising a second plurality of segments of bits, each segment of the inverse encryption key to correspond with a particular segment of the encryption key; and
a random pattern having equally distributed bit values, the random pattern to enable detection of voltage attacks on the first fuse block array.

2. The apparatus of claim 1, the first fuse block array comprising a plurality of hash values to validate data stored in the second fuse block array.

3. The apparatus of claim 1, the first fuse block array comprising an encryption protection enable segment and an integrity protection enable segment, the encryption protection enable segment to enable encryption for the second fuse block array and the integrity protection enable segment to enable hash value validation.

4. The apparatus of claim 1, comprising fuse controller logic, at least a portion of which is implemented in circuitry, the fuse controller logic to encrypt and decrypt data in the second fuse block array using the encryption key of the first fuse block array.

5. The apparatus of claim 4, the fuse controller logic to:
generate a hash value for decrypted data of the second fuse array; and
compare the hash value of the decrypted data with a second hash value stored in the first fuse block array to validate the decrypted data.

6. The apparatus of claim 5, the fuse controller logic to:
validate the decrypted data when the hash value matches the second hash value; and
invalidate the decrypted data when the hash value does not match the second hash value.

7. The apparatus of claim 4, the fuse controller logic to:
compare the random pattern with a random pattern value of a fuse controller, in response to determining the random pattern and the random pattern value match, determine a voltage attack is not occurring; and
in response to determining the random pattern and the random pattern value do not match, determine the voltage attack is occurring.

8. The apparatus of claim 1, the first fuse block array comprising a duplicate encryption key having duplicate bits of the encryption key, and a duplicate inverse encryption key having duplicate bits of the inverse encryption key.

9. The apparatus of claim 1, the first fuse block array and the second fuse block array comprising programmable read-only memory (PROM).

10. The apparatus of claim 1, comprising a processor unit having the first fuse block array, the second fuse block array, and fuse controller logic.

11. A non-transitory computer-readable storage medium comprising a plurality of instructions that, when executed by circuitry, enable circuitry to:
encrypt and decrypt data in a first fuse block array using an encryption key of a second fuse block array, the second fuse block array comprising:
the encryption key comprising a plurality of segments of bits;
an inverse encryption key comprising a second plurality of segments of bits, each segment of the inverse encryption key to correspond with a particular segment of the encryption key; and
a random pattern having equally distributed bit values, the random pattern to enable detection of voltage attacks on the second fuse block array.

12. The non-transitory computer-readable storage medium of claim 11, comprising a plurality of instructions, that when executed, enable circuitry to:
generate a hash value for decrypted data of the first fuse block array; and
compare the hash value of the decrypted data with a second hash value stored in the second fuse block array to validate the decrypted data.

13. The non-transitory computer-readable storage medium of claim 12, comprising a plurality of instructions, that when executed, enable circuitry to:
validate the decrypted data when the hash value matches the second hash value; and
invalidate the decrypted data when the hash value does not match the second hash value.

14. The non-transitory computer-readable storage medium of claim 11, comprising a plurality of instructions, that when executed, enable circuitry to:
compare the random pattern with a random pattern value of a fuse controller,
determine a voltage attack is not occurring in response to determining the random pattern and the random pattern value match; and
determine the voltage attack is occurring in response to determining the random pattern and the random pattern value do not match.

15. The non-transitory computer-readable storage medium of claim 11, the second fuse block array comprising a plurality of hash values to validate data stored in the second fuse block array.

16. The non-transitory computer-readable storage medium of claim 11, the second fuse block array comprising an encryption protection enable segment and an integrity protection enable segment, the encryption protection enable segment to enable encryption for the second fuse block array and the integrity protection enable segment to enable hash value validation.

17. The non-transitory computer-readable storage medium of claim 16, comprising a plurality of instructions, that when executed, enable circuitry to:
perform encryption and decryption of the data when the encryption protection enable segment is enabled; and
validate the data when the integrity protection enable segment is enabled.

18. A computer-implemented method, comprising:
encrypting data in a first fuse block array using an encryption key of a second fuse block array, the second fuse block array comprising:
the encryption key comprising a plurality of segments of bits;
an inverse encryption key comprising a second plurality of segments of bits, each segment of the inverse encryption key to correspond with a particular segment of the encryption key; and
a random pattern having equally distributed bit values, the random pattern to enable detection of voltage attacks on the second fuse block array.

19. The computer-implemented method of claim 18, comprising decrypting data in a second fuse block array using the encryption key of the first fuse block array.

20. The computer-implemented method of claim 18, comprising:
generating a hash value for decrypted data of the first fuse block array; and
comparing the hash value of the decrypted data with a second hash value stored in the second fuse block array to validate the decrypted data.

21. The computer-implemented method of claim 20, comprising:
validating the decrypted data when the hash value matches the second hash value; and
invalidating the decrypted data when the hash value does not match the second hash value.

22. The computer-implemented method of claim 18, comprising:
comparing the random pattern with a random pattern value of a fuse controller,
determining a voltage attack is not occurring in response to determining the random pattern and the random pattern value match; and
determining the voltage attack is occurring in response to determining the random pattern and the random pattern value do not match.

23. The computer-implemented method of claim 18, the second fuse block array comprising a plurality of hash values to validate data stored in the second fuse block array.

24. The computer-implemented method of claim 18, the second fuse block array comprising an encryption protection enable segment and a integrity protection enable segment, the encryption protection enable segment to enable encryption for the second fuse block array and the integrity protection enable segment to enable hash value validation.

25. The computer-implemented method of claim 24, comprising:
performing encryption and decryption of the data when the encryption protection enable segment is enabled; and
validating the data when the integrity protection enable segment is enabled.

* * * * *